United States Patent [19]
Lukich et al.

[11] Patent Number: 5,750,615
[45] Date of Patent: May 12, 1998

[54] USE OF FULLERENE CARBON IN CURABLE RUBBER COMPOUNDS

[75] Inventors: Lewis Timothy Lukich; Thomas Edwin Duncan; Colleen Marie Lansinger, all of Akron, Ohio

[73] Assignee: The Goodyear Tire & Rubber Company, Akron, Ohio

[21] Appl. No.: 757,713

[22] Filed: Nov. 26, 1996

[51] Int. Cl.$^6$ ..................................................... C08K 3/04
[52] U.S. Cl. ................ 524/495; 524/496; 423/DIG. 40
[58] Field of Search ................... 423/DIG. 39, DIG. 40; 524/495, 496

[56] References Cited

U.S. PATENT DOCUMENTS

| | | | |
|---|---|---|---|
| 5,069,892 | 12/1991 | Nakai | 423/445 |
| 5,100,637 | 3/1992 | Nakai | 423/445 |
| 5,206,283 | 4/1993 | Kawakami et al. | 524/496 |
| 5,248,722 | 9/1994 | DeTrano et al. | 524/496 |
| 5,272,203 | 12/1993 | Joyner et al. | 524/575 |
| 5,281,653 | 1/1994 | Thomann et al. | 524/490 |
| 5,284,898 | 2/1994 | Thise | 524/495 |
| 5,292,813 | 3/1994 | Patil et al. | 525/240 |
| 5,320,820 | 6/1994 | Yasuharu et al. | 423/449.1 |
| 5,336,730 | 8/1994 | Sandstrom et al. | 525/332.6 |
| 5,372,798 | 12/1994 | McConnachie et al. | 423/445 B |
| 5,378,754 | 1/1995 | Bauer et al. | 524/514 |

FOREIGN PATENT DOCUMENTS 575129  12/1993  European Pat. Off.

OTHER PUBLICATIONS

S. Lee et al. "Method For Estimating the Physical and Chemical Crosslink Densities of Cured Natural Rubber." Paper No. 76. Presented at 141st Mtg of the Rubber Div., Am. Chem Soc., Louisville, KY, May 19–22, 1992.

"Chemists Punch Hole in Fullerene Cage", by R. Dagani, Chemical & Engineering News, Jul. 10, 1995, p. 9.

"Buckybowl Representing Half of a $C_{60}$ Molecule is Synthesized", Chemical & Engineering News, Jun. 19, 1995, p. 22.

"Fullerenes from Space?", Science News, 145(24), Jun. 11, 1994, p. 381.

"Buckyballs Combine to Make Giant Fullerenes", by E. Pennisi, Science News, 142(10), Sep. 5, 1992, p. 149.

"The Renaissance Molecule", The Economist, May 23, 1992, pp. 91–93.

"Fullerenes", by R. Curl and R. Smalley, Scientific American (1991), pp. 54–63.

"Rheometers, Curemeters and Fatigue Testing", by P. Dimauro et al., and T. Luckenback, The Vanderbilt Rubber Handbook, 13th Edition (1990), pp. 542–561.

"Characterization of Rubber Cure with the Rheometrics Mechanical Spectrometer", by E. Hill, Rubber World, 189(3), (1983), pp. 15–23.

*Primary Examiner*—Mark Nagumo
*Attorney, Agent, or Firm*—Henry C Young, Jr.

[57] ABSTRACT

This invention relates to curable rubber compositions containing a fullerene form of carbon which is used as a reinforcing agent in the rubber compositions, the fullerene form of carbon being used in place of at least a portion of, or in addition to, the normally used forms of carbon black reinforcement additives. The invention particularly relates to tires having treads composed of such rubber composition(s). The fullerenes may optionally have surface modifications such as partial or complete hydrogen or functional group substitution. The fullerene form of non-conventional carbon reinforcement of rubber composition(s) may exist as discrete particles, aggregates of particles and/or agglomerates. The carbon fullerene has a lower specific gravity than conventional carbon black, thereby allowing a reduced weight tire or other article made from the rubber compound(s) for comparable volumes of carbon black used.

61 Claims, 3 Drawing Sheets

USE OF FULLERENE CARBON IN CURABLE RUBBER COMPOUNDS

TECHNICAL FIELD

The invention described herein pertains generally to the use of a non-conventional form of carbon namely, fullerenes, which may sometimes also be referred to as "buckminsterfullerenes", having a chemical formula of $C_{32}$ or higher, preferably $C_{60}$ or higher, in rubber compositions and particularly for use in tire treads.

BACKGROUND OF THE INVENTION

Pneumatic rubber tires are conventionally prepared with a rubber tread, which is often a blend of various rubbers and reinforced with carbon black. For example, a non-limiting list of such rubbers would include at least one, and more often two or more of, styrene/butadiene copolymer(s) (SBR) cis-1,4-polyisoprene including natural rubber, cis-1,4-polybutadiene and styrene/isoprene/butadiene terpolymer(s) as well as other elastomers. Further, such tires may, for example, have a tread composed of natural rubber, a tread composed of a blend of SBR and cis-1,4-polybutadiene rubbers, a tread composed of natural rubber and SBR as well as treads composed of tri-blends such as SBR (40–60 phr) with 30–35% styrene, cis-1,4-polyisoprene (20–30 phr) and cis-1,4-polybutadiene (20–30 phr). For example, see *The Vanderbilt Rubber Handbook*, 13th Edition (1990), pages 603–4).

The characteristics of carbon black are a significant factor in determining various properties of a rubber composition with which the carbon black is compounded. Conventionally, for rubber reinforcement, tire tread rubber compositions use high surface area, elastomeric reinforcing carbon blacks for a purpose of providing tread rubber compositions with good traction and abrasion resistance. On the other hand, in order to enhance the fuel efficiency of a motorized vehicle, a decrease in the rolling resistance of the tire tread portion is desirable. There are some indications in the prior art that this has been achieved, for example, by increasing the resilience of the rubber by using carbon blacks having a large particle diameter and a small surface area or carbon blacks having a wide range of aggregate size distribution per given particle diameter.

Prior art has taught and it is believed to be conventional wisdom that a tire tread composition designed to improve tread traction on the road usually results in a tire's increased tire rolling resistance. Similarly, modifying a tire tread composition to improve (reduce) a tire's rolling resistance usually results in a reduction in the tire tread traction and/or treadwear resistance. It is difficult to impart both high abrasion resistance and high resilience to the rubber at the same time, because the requirements have been thought to be contradictory with each other from the perspective of the properties of the carbon black in the rubber. These aspects involving a trade-off of tire, or tire tread, properties (traction, rolling resistance and treadwear) are well known to those having skill in such art.

Thus, selection of various reinforcing carbon blacks tend to play a role in the ultimate properties of the rubber composition.

For some tire tread applications, silica is used for at least a portion of the rubber reinforcement, often in conjunction with the carbon black, and usually accompanied by a silica coupler.

The term "phr" as used herein, and according to conventional practice, refers to "parts of a respective material per 100 parts by weight of rubber elastomer. In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and such terms are well known to those having skill in the rubber mixing or rubber compounding art.

SUMMARY OF THE INVENTION

In accordance with the present invention, a tire is provided having a tread composed of a rubber composition which contains, as reinforcement, a fullerene form of carbon, typically particulate, which is useful as a reinforcement in rubber compounds in place of at least a portion thereof, or in addition to, the normally used forms of carbon black reinforcement. The fullerenes may optionally have surface modifications such as partial or complete hydrogen or as functional group substitution to enhance reinforcement properties.

Such non-conventional, fullerene forms of carbon may be used as discrete particles and/or aggregates and agglomerates of such particles.

By fullerene carbon, it is meant to be any fullerene having at least one corrannulene ring structure, or moieties which incorporate the corrannulene ring structure. This allotropic form of carbon is characterized as having the formula $C_{2n}$; where n is an integer of at least 16, and ranges from about 16 to 960, more preferably from about 30 to about 240, and most preferably from about 30 to 40, which results in a closed cage structure of carbon atoms arranged at the vertices of at least 12 pentagons and at least 20 hexagons.

According to this invention, a tire is provided having a tread of a rubber composition comprised of, based on 100 parts by weight rubber (A) 100 parts by weight (phr) of at least one diene-based elastomer and (B) about 30 to about 100, alternatively about 35 to about 90, phr of particulate elastomer reinforcement composed of about five to about 100 weight percent of at least one fullerene carbon and from zero to about 95 weight percent of at least one of carbon black and precipitated silica; wherein said fullerene carbon is characterized by having the formula $C_{2n}$; where n is an integer of at least 16, preferably at least 30, sometimes preferably at least 35, and ranges from about 16 to 960, more preferably from about 30 to about 240, and most preferably from about 30 to 40, to result in a closed cage structure of carbon atoms.

Alternatively, the elastomer reinforcement may also be composed of (i) about 5 to about 90, alternatively about 10 to about 50, weight percent of said fullerene, and correspondingly (ii) about 95 to about 10, alternatively about 90 to about 50, weight percent of at least one reinforcing filler selected from at least one of carbon black and precipitated silica. Preferably, the carbon black has an Iodine adsorption value in a range of about 30 to about 150 g/kg, preferably about 100 to about 150 g/kg for tread rubber, and a DBP Number in a range of about 60 to about 140 cm$^3$/100 g, preferably about 100 to about 140 cm$^3$/100 g for tread rubber, and preferably the precipitated silica has a BET surface area as measured using nitrogen gas in a range of about 40 to about 600, preferably 50–300, and a DBP number in a range of about 100 to about 400, more preferably 150–300.

In practice, such fullerenes, or fullerene carbons, may also usually be characterized by having a specific gravity in a range of about 1.2 to about 1.7.

Such fullerenes are considered herein to be substantially spherical in form, and thus, are considered herein to be, basically, hollow, and by being composed of a multifaceted, three dimensional carbon black. The multifaceted carbon shell is generally composed of facets, or planes, of connecting hexagonally shaped surfaces, usually connected by pentagonally shaped surfaces.

An example of fullerenes may be reviewed in U.S. Pat. Nos. 5,281,653; 5,372,798; and 5,292,813 and, also, in an article entitled "Fullerenes" appearing in *Scientific American* (1990), October issue.

In one aspect of this invention, fullerene carbon can be used by itself as reinforcement for rubber compositions for tire treads or it can be used in combination with more conventional carbon black(s), e.g. tires), the fullerene form having a lower specific gravity, thereby allowing a reduced weight tire or other article made from the rubber compound.

In another aspect of this invention, the particulate fullerene carbon black, having a lower specific gravity, is used in place of more conventional carbon black reinforcements having a higher specific gravity, thereby allowing a reduction of overall tire weight.

In yet another aspect of this invention, a process of making a tire is disclosed wherein at least one vulcanizable rubber is combined with a sufficient amount of fullerene carbon reinforcing filler or a mixture of a fullerene carbon and a non-fullerene carbon, to result in a modification of the dynamic properties of the tire compared to those of the tire for which no fullerene carbon had been added.

It is still yet another object of this invention to disclose a composition of at least one vulcanizable rubber, preferably at least one sulfur vulcanizable rubber, and a sufficient amount by weight of fullerene carbon in comparison to the rubber to result in a modification of the dynamic properties of the rubber compared to those of the rubber without any added fullerene carbon. In this embodiment, it is preferred that the tread of the rubber composition be comprised of, based on 100 parts by weight rubber (A) 100 parts by weight (phr) of at least one diene-based elastomer and (B) about 30 to about 100, alternatively about 35 to about 90, phr of particulate elastomer reinforcement composed of about five to about 100 weight percent of at least one fullerene carbon and from zero to about 95 weight percent of at least one of carbon black and precipitated silica; wherein said fullerene carbon is characterized by having the formula $C_{2n}$; where n is an integer of at least 16, preferably at least 30, sometimes preferably at least 35, and ranges from about 16 to 960, more preferably from about 30 to about 240, and most preferably from about 30 to 40, to result in a closed cage structure of carbon atoms.

Alternatively, the elastomer reinforcement may also be composed of (i) about 5 to about 90, alternatively about 10 to about 50, weight percent of said fullerene, and correspondingly (ii) about 95 to about 10, alternatively about 90 to about 50, weight percent of at least one reinforcing filler selected from at least one of carbon black and precipitated silica. Preferably, the carbon black has an Iodine adsorption value in a range of about 30 to about 150 g/kg, preferably about 100 to about 150 g/kg for tread rubber, and a DBP Number in a range of about 60 to about 140 cm³/100 g, preferably about 100 to about 140 cm³/100 g for tread rubber, and preferably the precipitated silica has a BET surface area as measured using nitrogen gas in a range of about 40 to about 600, preferably 50–300, and a DBP number in a range of about 100 to about 400, more preferably 150–300.

These and other aspects of this invention will be evident when viewed in light of the drawings, further detailed description and appended claims.

BRIEF DESCRIPTION OF THE DRAWINGS

The invention may take physical from in certain parts and arrangements of parts, a preferred embodiment of which will be described in detail in the specification and illustrated in the accompanying drawings which form a part hereof, and wherein a brief description of the drawings is.

In particular, the rubber composition Sample No. 1 contains 45 phr of N299 general purpose tread rubber carbon black reinforcement (GPT) as indicated by curve labeled 1 in FIG. 1.

The rubber composition Sample No. 2 contains 45 phr of N660 general purpose furnace carbon black reinforcement (GPF) as indicated by the curve labeled 2 in FIG. 1.

The rubber composition Sample No. 3 contains 45 phr particulate fullerene carbon remaining after a $C_{60/70}$ fraction has been extracted from fullerene-containing carbon granules and identified by the curve labeled 3 in FIG. 1. The term "$C_{60/70}$" fraction relates to a blend of fullerenes composed of 60 and of 70 carbon atoms, respectively.

The rubber composition Sample No. 4 contains 45 phr particulate fullerene carbon concentrated as primarily a $C_{60/70}$ fraction and identified by the curve labeled 4 in FIG. 1.

ADDITIONAL DESCRIPTION OF THE INVENTION

It is recognized that various forms of carbon blacks have been used for the reinforcement of rubber in rubber treads for quite some time. In general, these carbon blacks are characterized by having dibutylphthalate (DBP) numbers in a range of about 60 to 140 cm³/100 g and Iodine adsorption values in a range of about 30 to about 150 g/kg and with an ASTM series designation of N100 to about N900 (see *The Vanderbilt Rubber Handbook*, 1978 edition, pages 414–418 for carbon black descriptions).

In about 1985, a third form of the element carbon was discovered. The new form was not a continuous array of atoms like diamond or graphite, which are more familiar forms of carbon, but a molecule of at least 32 atoms and preferably at least 60 atoms connected together to form a sphere. This sphere, apparently the most symmetrical molecule known to science to date, is made up of a pattern of hexagons and pentagons like the seams on a soccer ball.

In the more familiar diamond form of carbon, each carbon atom is tied tightly to four others by chemical bonds. In the more familiar graphite form of carbon, the carbon atoms lie in sheets of hexagons, with each carbon atom bound to three other carbon atoms. These sheets are arranged in stacks, sliding past each other relatively easily, which apparently enables graphite to be a lubricant for numerous purposes.

As reviewed in The Economist, "The Renaissance Molecule", v. 323, n. 7760, p. 91–93 (1992), the third form of carbon, the fullerenes, might be synthesized when very hot carbon atoms and fragments of graphite bang into each other. The graphite fragments are warped because the carbon atoms at the frayed edges of the sheet, eager to bind to something, reach out for each other. If a single carbon atom chances to bump into the edge at that point, it can join with two loose ends to form a pentagon. Pentagons will tend to make the surface to be more curved in nature. A sheet of hexagons will tend to lie flat. However, a mixture of pentagons and hexagons will not. If the conditions are properly chosen, the growing fragments will be able to adjust themselves so that the pentagons stay away from each other (adjacent pentagons are unstable) and the surface will curl up until it eventually closes, leaving no bare edge at all, and thereby form a sphere. The spherical $C_{60}$ fullerene (buckyball) is the most common end-product, because this familiar pattern (known as a truncated icosahedron) is the smallest in which all of the pentagons can be spaced apart by hexagons. Smaller arrangements (buckybabies) are possible and can contain as few as 32 atoms. However, because they contain adjacent pentagons, they are much less stable. If more hexagons are added, larger molecules can be made which keep the pentagons even further apart, leading to the synthesis of $C_{70}$, $C_{76}$ and $C_{78}$ fullerenes, for example.

Fullerenes are, therefore, large, hollow, three-dimensional carbon structures. The most easily formed is carbon-60 ($C_{60}$). It may typically be produced by laser evaporation of graphite. The shape of this molecule resembles a soccer ball. It is possible during the laser evaporation process to have fullerene films to vaporize and combine like soap bubbles, producing united molecules which billow to form stable fullerenes with 400 or more carbon atoms. It is also possible to add an extra atom of carbon to the outside surface of the fullerenes, thus, forming what might be called a fulleroid.

Figure 5:
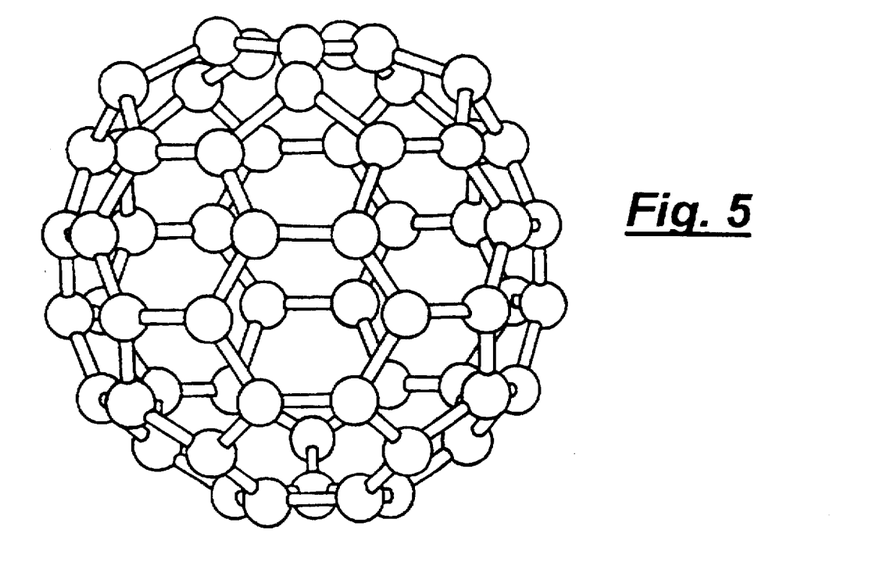
FIG. 5 is also a pictorial representation of a corrannulene ring structure within a fullerene.

As used in the application, the term "fullerene" will mean the allotropic form of carbon in which the carbon atoms are present in even numbers and are arranged at the vertices of a closed hollow cagelike structure such as is shown in FIG. 5. Typically, fullerenes each have carbon atoms arranged as 12 pentagons, but differing numbers of hexagons. The pentagons are required in order to allow the curvature and eventual closure of the closed surface itself. Therefore, a $C_{60}$ fullerene will consist of 12 pentagons and 20 hexagons and is classified as an icosahedron, the highest symmetry structure possible. A $C_{70}$ fullerene contains 12 pentagons and 25 hexagons. Fullerenes may be synthesized by methods known in the art or purchased commercially. When the fullerenes are present as a mixture of fullerene types, e.g., $C_{60}$, $C_{70}$, $C_{84}$, etc., pure samples may be separated from mixtures of $C_{60}$ and other fullerenes by chromatography. Suitably, any fullerene or fullerene mixture may be used as a starting material so long as the fullerene contains at least one corrannulene structure. Thus, for example, $C_{60}$, $C_{70}$, $C_{76}$, $C_{78}$, $C_{82}$, $C_{84}$, $C_{90}$, $C_{96}$, $C_{120}$ or larger fullerenes, having the required corrannulene structure can be used.

Figure 4:
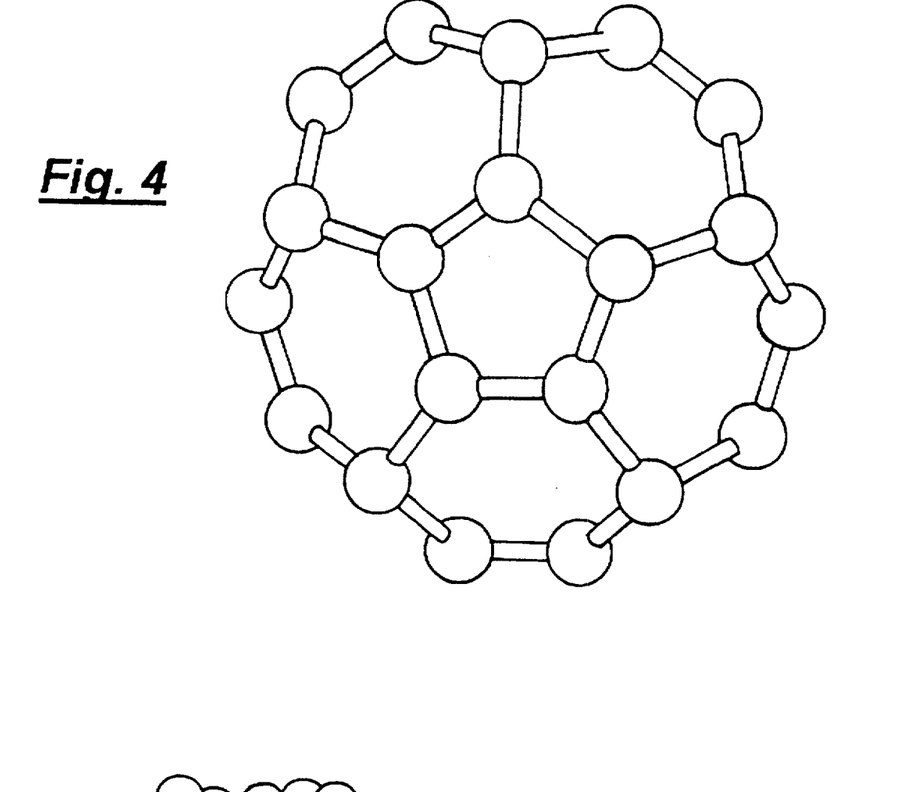
FIG. 4 is a pictorial representation of a corrannulene ring structure.

As defined in this application, a corrannulene ring structure in a fullerene consists of a single five membered (i.e., pentagonally shaped) carbon ring surrounded by five six-membered (i.e., hexagonally shaped) carbon rings as shown in FIG. 4. See, e.g., Diederich, et al., Acc. Chem. Res. 1992, 24, 19–126, and Miller, Chem. And Ind., 1993, 226–231. There are 12 such substructures in each fullerene in a preferred embodiment. Many of the corrannulene ring structures overlap insofar as they share one or two of the six-membered carbon rings between them. Typically, fullerenes larger than $C_{60}$, such as $C_{70}$, and higher fullerenes also would be expected to have at least one, more typically two non-overlapping or complete corrannulene ring structures. For further information concerning the structure of fullerenes, see e.g., H. W. Kroto et al., 91 Chemical Reviews, 1213–1235 (1991).

Normal, or conventionally used, carbon black reinforcement for elastomers, as in rubber compositions, has a specific gravity in a range of 1.75 to 1.82. By contrast, the specific gravity of fullerenes ranges from about 1.2 to 1.7, thereby leading to the making of useful rubber compositions having a lower specific gravity, and thereby allowing a reduced weight tire or other article made from the rubber compound. Typically in tire tread formulations, carbon black may be present, for example, in an amount of from about 30 phr to about 100 phr, alternatively about 35 to about 90 phr, and alternatively about 35 to about 55 phr. Due to the lower density of the fullerene carbons, the equivalent volume of fullerene carbon when compared to typical carbon black, will be less, thereby achieving a weight reduction in the tire when at least a portion of the carbon black is replaced with an equivalent volume of fullerene form of carbon.

In the practice of this invention, the tread rubber composition is comprised of at least one diene-based elastomer, or rubber. Thus, it is considered that the elastomer is a sulfur curable, i.e., vulcanizable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, butadiene/acrylonitrile copolymer rubbers, styrene/isoprene/butadiene terpolymer rubbers, and cis 1,4-polybutadiene rubber.

In another aspect of this invention, the rubber is at least two of diene based rubbers. For example, a combination of two or more rubbers may include combination such as cis 1,4-polyisoprene (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

In one aspect of this invention, an emulsion polymerization derived styrene-butadiene (E-SBR) might be used having a relatively conventional styrene content of about 20 to about 28% bound styrene or, for some applications, an E-SBR having a medium to relatively high bound styrene content, namely, a bound styrene content of about 30 to about 45%.

The relatively high styrene content of about 30 to about 45% for the E-SBR can be considered beneficial for a purpose of enhancing traction, or skid resistance, of the tire tread. The presence of the E-SBR is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, such as E-SBAR, in amounts for example, of about 2 to about 30 weight percent bound acrylonitrile in the terpolymer.

Emulsion polymerization prepared butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably 9 to about 36 weight percent. The S-SBR can be conveniently prepared, for example, by organo-lithium catalyzation in the presence of an organic hydrocarbon solvent. A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI is more fully described in U.S. Pat. No. 5,087,668 which is incorporated herein by reference.

The cis-1,4-polybutadiene rubber (BR) is considered to be beneficial for a purpose of enhancing the tire tread's wear or treadwear. Such BR can be prepared, for example, by organic solution polymerization of 1,3-butadiene. The BR may conveniently characterized, for example, by having at least a 90% cis-1,4 content. The cis-1,4-polyisoprene and cis 1,4-polyisoprene natural rubber are well known to those having skill in the rubber art.

While the focus above has been on tread rubber, the invention is not limited to such. Various diene-based elastomers may be used in the practice of this invention. Preferably, such elastomers are sulfur curable elastomers. For example, such elastomers may be selected from homopolymers and copolymers of conjugated dienes such as 1,3-butadiene and isoprene, and from copolymers of conjugated dienes such as, for example, 1,3-butadiene and/or isoprene with a vinyl aromatic compound such as styrene or alpha-methylstyrene.

Representative of homopolymers of conjugated dienes are, for example, cis-1,4-polybutadiene, a polymer of 1,3-butadiene and cis 1,4-polyisoprene. Representative of copolymers of conjugated dienes are, for example, isoprene/butadiene copolymers. Representative of copolymers of conjugated diene(s) and vinyl aromatic compounds are, for example, styrene butadiene copolymers and styrene/isoprene terpolymers.

Most commercially available tire treads contain various amount of additives. Typically amounts of tackifier resins, if used, comprise about 0.5 to about 10 phr, usually about 1 to about 5 phr. Typical amounts of processing aids and rubber compounding ingredients comprise about 1 to about 50 phr. Such processing aids can include, for example, aromatic, naphthenic, and/or paraffinic processing oils. Stearic acid is typically referred to as a rubber compounding ingredient. As purchased, it typically contains primarily stearic acid with small amounts of at least one of oleic acid, linolenic acid and palmitolic and/or palmitic acid. The mixture may also contain small amounts (less than about six weight percent) of myristic acid, arachidic acid and/or arachidonic acid. Such material or mixture is conventionally referred to in the rubber compounding art as stearic acid. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 0.5 to about 3 phr. Typical amounts of fatty acids, if used, which can include stearic acid comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

In another alternative embodiment of this invention, the formulation can additionally contain silica and/or a silica coupling agent, wherein the amount of particulate silica ranges from about 5 to about 90, optionally about 25 to about 90 phr and wherein the silica coupling agent is contained in an amount from wherein the weight ratio of silica coupler to silica is from about 0.1/1 to about 0.2/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica might be expected to have an average ultimate particle size, for example, in the range of 0.01 to 0.05 micron as determined by the electron microscope, although the silica particles may be considered for use in this invention such as, only for example herein, and without limitation, silicas commercially available from PPG Industries under the Hi-Sil trademark with designations 210, 243, etc.; silicas available from Rhone-Poulenc with, for example, designations VN2 and VN3, and silicas from Akzo Chemical, etc.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica (if used) and silica coupler (if used), and fullerene carbon, are mixed in one or more non-productive mix stages. The terms "non-productive" and "productive" mix stages are well known to those having skill in the rubber mixing art. The tire can be built, shaped, molded and cured by various methods which are known and will be readily apparent to those having skill in such art.

The best mode for carrying out the invention will now be described for the purposes of illustrating the best mode known to the applicant at the time. The examples are illustrative only and not meant to limit the invention, as measured by the scope and spirit of the claims. The following rubber compounds were prepared using the procedure outlined in Example I and exemplified in the following Table 1.

EXAMPLE I

Rubber compositions were prepared using various rubber reinforcing carbon blacks and particulate fullerene carbons as reinforcement.

In particular, a rubber composition containing conventional rubber reinforcing carbon black N299 is prepared and identified herein as Sample No. 1.

A rubber composition containing conventional rubber reinforcing carbon black N660 is prepared and identified herein as Sample No. 2.

A rubber composition containing fullerene carbon soot, after removal of $C_{60}/C_{70}$ fullerenes, is prepared and identified herein as Sample No. 3.

A rubber composition containing $C_{60}/C_{70}$ fullerene carbon extracted from fullerene soot is prepared and identified herein as Sample No. 4.

The following Table 1 illustrates the rubber composition used for this Example. The Table 2 illustrates the specific allocation of the carbon blacks and fullerene carbons in the formulation illustrated in Table 1.

TABLE 1

| Material | Parts per 100 Parts Rubber |
| --- | --- |
| Rubber[1] | 100.00 |
| Carbon[2] | 45.00 |
| Processing Oil[3] | 5.00 |
| Antidegradant[4] | 2.00 |
| Fatty Acid[5] | 2.00 |
| Vulcanization Inhibitor[6] | 0.50 |
| Accelerator[7] | 1.60 |
| Metal Oxide[8] | 3.00 |
| Sulfur[9] | 1.20 |

[1]Synthetic cis 1,4-polyisoprene known as Natsyn ® from The Goodyear Tire & Rubber Company;
[2]Variously, N299, N660, fullerene soot after removal of $C_{60/70}$ fullerenes, and concentrated $C_{60/70}$ fullerenes which have extracted from soot which contains fullerenes including fullerenes composed of 60 and of 70 carbon atoms, the blend being referred to herein as $C_{60/70}$ fullerenes;
[3]Liquid naphthenic hydrocarbon known as Flexon ® 641 from Exxon;
[4]N-(1,3-dimethylbutyl)-N'-phenyl-1,4-phenylenediamine known as Industrene ® R from the Witco company;
[5]Octadecenoic acid known as Santoflex ® 13 from the Flexsys America L.P. company;
[6]N-cyclohexylsulfenylphthalimide known as Santoguard ® PVIDS from the Flexsys America L.P. company;
[7]N-t-butyl-2-benzothiazolesulfenamide known as Delac ® NS from Uniroyal;
[8]Zinc oxide;
[9]Rubber makers sulfur.

The rubber composition was prepared by first mixing the ingredients exclusive of the vulcanization inhibitor, accelerator and sulfur in an internal rubber mixer for about 4 minutes to a temperature of about 160° C.

Then, to the resulting rubber mixture was mixed, in an internal rubber mixer, the remaining vulcanization inhibitor, accelerator and sulfur for about two minutes to a temperature of about 110° C.

The prepared samples resulting from the above compounding are summarized in Table 2, identifying the sample with the particular form of carbon used.

TABLE 2

| Carbon Form | 1 | 2 | 3 | 4 |
| --- | --- | --- | --- | --- |
| Carbon Tread Black N299 | 45 phr | | | |
| Carbon Furnace Black N660 | | 45 phr | | |
| Fullerene carbon soot after $C_{60/70}$ fullerene removal | | | 45 phr | |
| Fullerenes ($C_{60/70}$ extracted from fullerene soot) | | | | 45 phr |

The $C_{60/70}$ fullerene carbons may be obtained by solvent extraction, for example toluene solvent extraction, from fullerene soot which contains fullerenes composed of 60 and of 70 carbon atoms in order to concentrate the $C_{60/70}$ fraction for use in this Example.

One of the key performance criterion in tire performance is a measure of the hysteresis effect on an elastomer composition. The hysteresis of a rubber compound refers to the difference between the energy applied to deform a rubber compound and the energy released as the rubber compound recovers to its initial undeformed state. In other words, hysteresis is a measure of lost energy as measured by heat generated. The stress-strain curves of vulcanized rubber, display hysteresis, in that strain (elongation) persists when the deforming stress is removed, thus, producing a hysteresis loop instead of a reversible pathway of the curves. This loop indicates a loss of resilient energy.

Viscoelastic testing measures polymer properties which depend on stress, strain and their time derivatives. In dynamic testing, G' is a measure of the storage or elastic modulus while G" is a measure of loss or viscous modulus, values well known in the rubber evaluation art.

Figure 1:
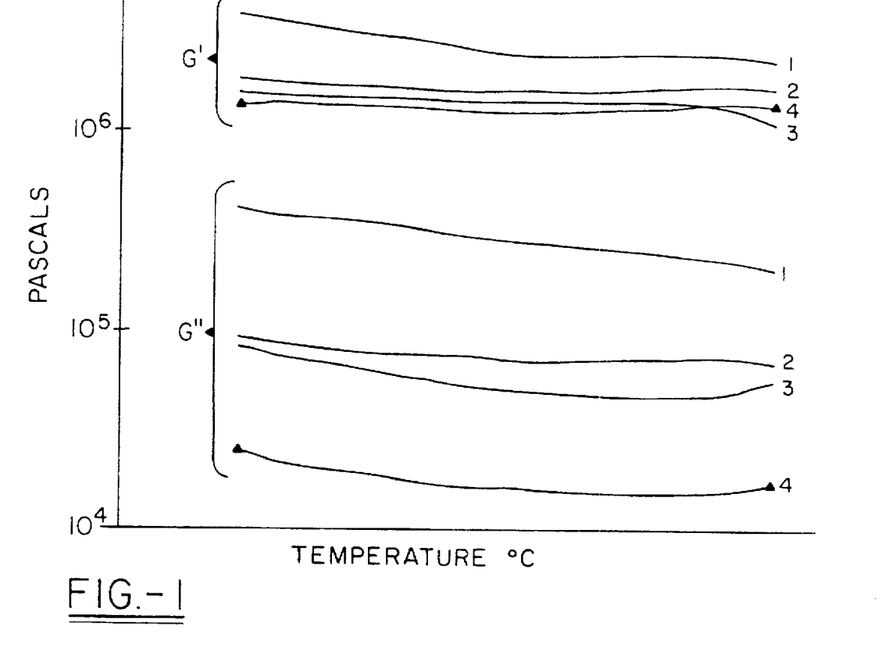
FIG. 1 is a series of dynamic plots of elastic modulus G' and loss modulus G" vs. temperature (°C.) for four rubber compositions with various types of carbon black (Samples 1 and 2) and of fullerene carbon reinforcement (Samples 3 and 4). A temperature sweep in which the temperature is varied from room temperature (≈25° C.) to 160° C. and at a constant 2 percent dynamic strain and constant frequency of one hertz (Hz). The terms "elastic modulus" and "loss modulus" used in evaluating various rubber compositions are well known to those having skill in such evaluation art.

FIG. 1, as hereinbefore referenced, shows data resulting from temperature sweeps from a Rheometrics System IV instrument at constant strain using techniques which are well-known in the art, and are described in *Rubber World*, "Characterization of Rubber Cure with the Rheometrics Mechanical Spectrometer", Hill, H. E., 189(3), 15–23 (1983) or as described in *The Vanderbilt Rubber Handbook*, 13th Edition, 542–561 (1990).

As seen in FIG. 1, the rubber sample containing the concentrated $C_{60/70}$ fullerene (Sample No. 4), the fullerene soot (Sample No. 3) and the general purpose furnace black N660 (Sample No. 2) all exhibited similar reinforcing ability of the carbon as shown by the similarity in the value of G'. The rubber sample containing the general purpose tread black N299 (Sample No. 1) did exhibit slightly better reinforcing ability. However, carbon reinforcing ability does not present the entire picture. At least equal in significance is the curve G", which is a measure of internally generated heat. This value is usually desired to be as low as reasonably possible, thereby minimize the loss of carbon-to-carbon bond interactions in the rubber composition and additionally tending to minimize the potential for high temperature cure reversion. As seen in FIG. 1, the rubber sample containing the $C_{60/70}$ fullerene (Sample No. 4) exhibited an extremely low G" curve, indicating that the compound exhibits relatively low internally generated heat indicating lesser degrees of the breakdown of carbon-carbon interaction in the filler carbon material. This fullerene form of carbon additive is, thus, observed to maximize the difference between the curves for G' and G", an extremely desirable result. The rubber sample containing the fullerene soot with the $C_{60/70}$ fraction removed, or extracted out, (Sample No. 3) and the rubber sample containing the general purpose furnace black N660 (Sample No. 2) performed similarly in regard to internally generated heat parameter, whereas the rubber sample containing the general purpose tread black N299 (Sample No. 1) exhibited the highest amount of heat generation, even though it exhibited the best reinforcing capabilities.

Figure 2:
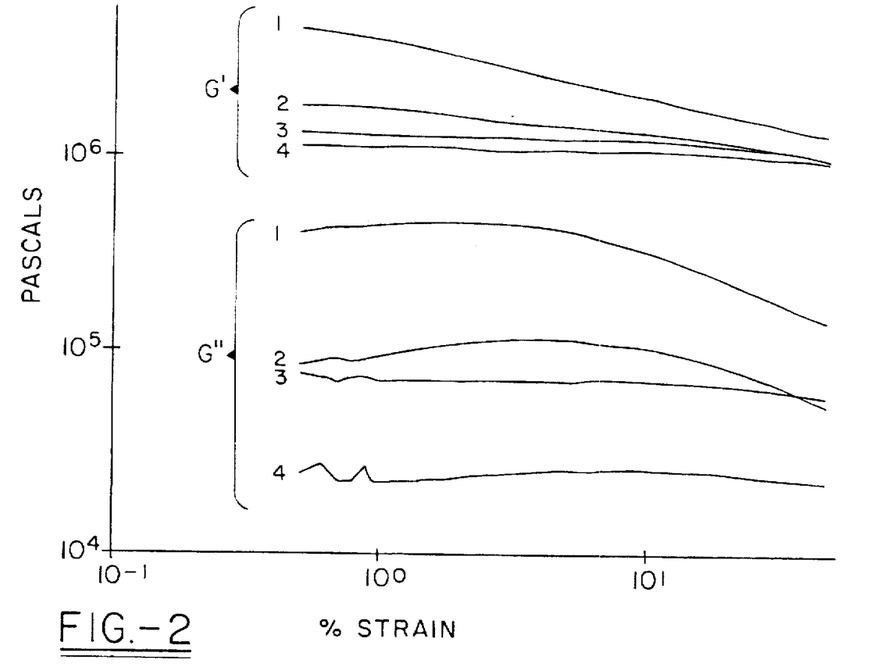
FIG. 2 is a series plots of curves for the rubber Samples 1–4 exemplified in FIG. 1 except that the data was obtained at a constant temperature of about 25° C., a constant one hertz (Hz) sweep frequency and a variable strain of from two to fifty percent.

The hereinbefore referenced FIG. 2 shows a series of strain sweeps for the respective rubber composition generated by the Rheometrics System IV instrument at constant temperature. In this figure, it can be easily seen from the essentially flat response curves of G' and G", that the rubber samples containing the fullerene carbon reinforcing material (Samples 3 and 4) minimizing the breakdown of carbon-carbon interaction in the filler carbon material and, therefore, not generating internal heat. This is in sharp contrast to that observed for the rubber sample containing the tread black N299 (Sample No. 1) and the rubber sample containing the furnace black N660 (Sample No. 2), where large hysteresis effects are seen due to the significant slope to the generated curves indicating that the materials are losing their integrity and reinforcement capability and physical properties.

Figure 3:
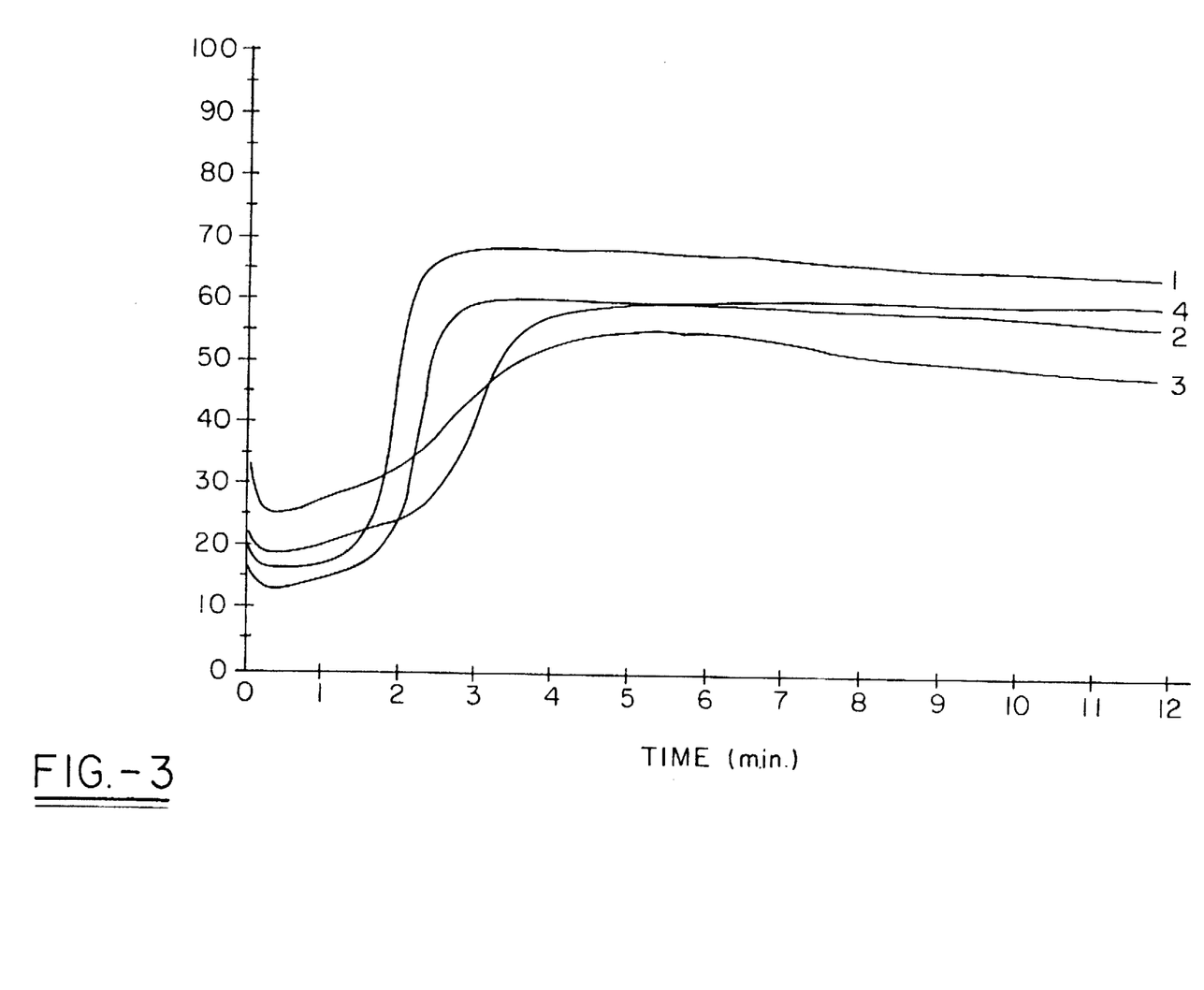
FIG. 3 is a series of oscillating disc curemeter rheometer rheographs in dN-m (decinewton meters) of the rubber samples used in FIG. 1 run at 160° C.

The hereinbefore referenced FIG. 3 shows a series of rheographs run at 160° C. for 60 minutes. These set of curves clearly show that the rubber samples containing the fullerenes are significantly slower curing than the rubber samples containing either the furnace black or the tread black. Notable is the fact that the cure reversion appears to be almost totally inhibited when using the concentrated $C_{60/70}$ fullerene (Sample No. 4). The other samples all exhibited varying degrees of cure reversion as shown by the slope of the curve with time. One possible explanation for the slower cure times exhibited by the fullerene rubber samples containing the carbons is that fullerenes are believed to act as radical scavengers, thereby trapping some of the vulcanization initiators and increasing cure times. This feature, however, may prove to be extremely beneficial in the final cured rubber since the filler carbon may subsequently be capable of acting as an antiozonant or an antioxidant or both.

Additional physical characterization of the above samples is summarized in the following Table 3.

TABLE 3

| Parameter | No. 1 N299 | No. 2 N660 | No. 3 $C_{60/70}$+ | No. 4 $C_{60/70}$ |
|---|---|---|---|---|
| ODR 900 at 160° C. (Uncured Rubber)[1] | | | | |
| Min. Torque (dNm) | 8.7 | 6.8 | 13.5 | 9.6 |
| Max. Torque (dNm) | 35.0 | 30.5 | 28.4 | 30.5 |
| $T_{25}$ (min) | 8.7 | 9.9 | 9.5 | 12.3 |
| $T_{50}$ (min) | 9.6 | 11.0 | 12.7 | 14.5 |
| $T_{90}$ (min) | 11.1 | 12.6 | 18.4 | 17.8 |
| Resilience[2] | | | | |
| % Resilience @ 100° C. | 67.9 | 76.3 | 72.0 | 79.6 |
| Modulus/Tensile/Elongation[3] | | | | |
| 300% Modulus (MPa) | 9.22 | 7.54 | 4.58 | 5.56 |
| Tensile (MPa) | 24.2 | 21.0 | 8.9 | 17.9 |
| Goodrich Blowout[4] (25 min @ 160° C.) | | | | |
| Max Temp (°C.) | 160 | 107 | 132 | 102 |
| Blowout Time (min) | 33 | >60 | 4 | >60 |
| Rheometrics System IV[5] (25° C. and 1 Hz) | | | | |
| G' (MPa) @ 2% Strain | 23.00 | 12.00 | 9.56 | 8.77 |
| Tan. Delta @ 2% Strain | 0.1605 | 0.0798 | 0.0655 | 0.0268 |
| G' (MPa) @ 10% Strain | 14.64 | 9.63 | 9.10 | 8.50 |
| Tan. Delta @ 10% Strain | 0.1782 | 0.0951 | 0.0688 | 0.0295 |
| G' (MPa) @ 50% Strain | 9.68 | 7.57 | 7.44 | 7.65 |
| Tan. Delta @ | 0.1222 | 0.0654 | 0.0715 | 0.0288 |

TABLE 3-continued

| Parameter | No. 1 N299 | No. 2 N660 | No. 3 $C_{60/70}+$ | No. 4 $C_{60/70}$ |
|---|---|---|---|---|
| ODR 900 at 160° C. (Uncured Rubber)[1] | | | | |
| 50% Strain | | | | |
| Treadwear[6] | | | | |
| DIN Abrasion | 156 | 248 | 236 | 234 |

[1]ASTM D/2084;
[2]DIN 53512;
[3]ASTM D/412;
[4]ASTM D/623;
[5]Rubber World, "Characterization of Rubber Cure with the Rheometrics Mechanical Spectrometer", Hill, H. E., 189(3), 15–23 (1983) or as described in The Vanderbilt Rubber Handbook, 13th Edition, 542–561 (1990); and
[6]DIN 53516.

A few significant features shown in the table would include the excellent results seen in the Goodrich Blowout test, a measure of heat build-up. The rubber sample containing the fullerene carbon, particularly $C_{60/70}$ showed the lowest heat build-up yielding a temperature of 102° C. after 60 minutes. This demonstrates that the rubber compound integrity is remaining intact. Additionally, dynamic testing using the Rheometrics System IV, showed significantly flatter curves for the rubber samples containing the fullerene carbons in contrast to that shown by either tread or carcass furnace blacks. The value of G' ranged from 8.77 to 7.65 ($\Delta$ 1.12) for the rubber sample containing the $C_{60/70}$ fullerenes, from 9.56 to 7.44 ($\Delta$ 2.12) for the rubber sample containing the fullerene soot, from 12.00 to 7.57 ($\Delta$ 4.43) for the rubber sample containing the furnace black N660, and from 23.00 to 9.68 ($\Delta$ 13.32) for the rubber sample containing the N299 tread carbon black. The lower the delta between the two values, the more desirable the result.

A comparison of the abrasion values with that of resilience similarly yields favorable conclusions for the rubber compositions containing the fullerene blacks. Better rolling resistance (higher resilience number) is usually not linked favorably with abrasion values which are often predictive of treadwear (lower numbers are desired). In fact, conventional thinking is that as the DIN abrasion increases, lower resilience is typically expected. However, as seen in the comparison of the rubber composition containing the tread black N299 with the rubber composition containing the $C_{60/70}$ fullerene concentrate, the superior rolling resistance (as predicted by resilience) of the rubber composition containing the fullerene carbon (79.6) translates favorably with a good treadwear (as predicted by DIN abrasion) having a value of 234. The rubber composition containing the tread black N299, which has the lowest rolling resistance (as predicted by % resilience) of 67.9 (worst performance), has as expected, the best value for treadwear (as predicted by DIN abrasion) having a value of 156. This favorable relationship between predicted rolling resistance and predicted treadwear was unexpected for the fullerene carbon.

Therefore, what has been shown is that fullerene reinforce in a manner similar to that of general purpose furnace blacks and do not appear to suffer carbon-to-carbon interaction breakdown. Essentially pure, or at least concentrated, $C_{60/70}$ fullerenes would appear to reinforce the rubber composition better than the mixed fullerene soot with higher carbon fullerene homologs, and the fullerenes would appear to reinforce without a build-up in hysteresis. While the experimental results were derived by using fullerene carbons by themselves, it is certainly expected that merely replacing a portion of the carbon black normally used in rubber compounding, would benefit the final compounded rubber.

Discussion

It should be emphasized that this invention is not limited to the use of non-conventional carbon in tires, but rather is useful in all rubbers. The invention either supplements or replaces carbon blacks which are typically used as rubber reinforcement. The non-conventional form of carbon may or may not have surface modifications, such as partial or complete hydrogen or functional group substitution to enhance the reinforcement properties. The non-conventional carbon may exist as discrete particles or as bonded structures.

By surface modifications, it is possible to use less of the carbon to obtain similar reinforcement capabilities, thus, reducing the cost of the replacement or to even replace a chemical such as Resorcinol by drafting functional hydroxy groups to the carbon and reacting with a material such as hexamethoxymethylmelamine to form an "in-situ" resin/black matrix within the polymer network. Other functional groups are envisioned to be within the scope of this invention, of which several non-limiting examples would include —SH and —CH$_2$OH. Additional non-conventional carbon modifications include the inclusion of a cage molecule within the carbon framework, thereby providing additional modifications to the carbon reinforcement. The limitations placed on the cage molecule are obvious to those skilled in the art, and would include, for example, that the effective volume of the molecule be smaller than that of the size of the cage of the fullerene carbon, and that the molecule be compatible with the cage.

Additionally, it is to be noted that while the preferred embodiment of this invention will utilize fullerene carbon which is present as a closed cage structure, the invention is not limited to such. In fact, it is believed that a composition which contains at least one vulcanizable rubber and a sufficient amount by weight of a carbon having at least one corranulene structure, in comparison to the rubber to result in a modification of the dynamic properties of the rubber compared to those of the rubber without any added carbon having the corrannulene structure is a part of this invention. The aspect of curvature in the structure of the carbon is believed to be sufficient to impart at least some of the beneficial results demonstrated when using the closed cage fullerene-carbon.

While certain representative embodiments and details have been shown for the purpose of illustrating the invention, it will be apparent to those skilled in this art that various changes and modifications may be made therein without departing from the spirit or scope of the invention.

What is claimed is:

1. A tire is provided having a component composed of a rubber composition comprised of, based on 100 parts by weight rubber (A) 100 parts by weight (phr) of at least one diene-based elastomer and (B) about 30 to about 100 phr of elastomer reinforcement composed of about 5 to about 100 weight percent of at least one fullerene carbon and from zero to about 95 weight percent of at least one of carbon black or precipitated silica; wherein said fullerene carbon is characterized by having the formula $C_{2n}$; where n is an integer of at least 30.

2. The tire of claim 1 wherein said tire component is a tread intended to be ground-contacting.

3. The tire of claim 2 wherein the elastomer for said component thereof is selected from the group consisting of homopolymers and copolymers of conjugated dienes and wherein the homopolymer is selected from the group consisting of natural cis-1,4-polyisoprene rubber, synthetic cis-1,4-polyisoprene rubber, 3,4-polyisoprene rubber, cis-1,4-polybutadiene rubber and mixtures thereof and wherein the copolymer is selected from the group consisting of isoprene/butadiene copolymer rubbers, styrene/butadiene copolymer rubbers, styrene/isoprene copolymer rubbers, butadiene/acrylonitrile copolymer rubbers, isoprene/acrylonitrile copolymer rubbers, styrene/isoprene/butadiene terpolymer rubbers, α-methylstyrene/butadiene copolymer rubbers, α-methylstyrene/isoprene copolymer rubbers, butadiene/acrylonitrile copolymer rubbers, isoprene/acrylonitrile copolymer rubbers, α-methylstyrene/isoprene/butadiene terpolymer rubbers and mixtures thereof.

4. The tire of claim 3 wherein said tire component is a circumferential tread.

5. The tire of claim 1 wherein the elastomer for said component thereof is at least one sulfur vulcanizable diene-based elastomer.

6. The tire of claim 5 wherein the elastomer for said component thereof is at least two diene-based elastomers.

7. The tire of claim 6 wherein said tire component is a circumferential tread.

8. The tire of claim 6 wherein at least one diene-based elastomer for said component thereof is selected from the group consisting of natural cis-1,4-polyisoprene rubbers, synthetic cis-1,4-polyisoprene rubbers, 3,4-polyisoprene rubbers, cis-1,4-polybutadiene rubbers, styrene/isoprene (butadiene rubbers, isoprene/butadiene copolymer rubbers, styrene/butadiene copolymer rubbers, and butadiene-acrylonitrile copolymer rubbers.

9. The tire of claim 8 wherein for said reinforcement for said component thereof is composed of about 5 to about 90 weight percent of said fullerene carbon and, about 95 to about 10 weight percent of at least one of carbon black or precipitated silica.

10. The tire of claim 9 wherein the reinforcement for said component thereof is present in an amount of from 35 phr to 90 phr.

11. The tire of claim 10 wherein said tire component is a circumferential tread.

12. The tire of claim 9 wherein said tire component is a circumferential tread.

13. The tire of claim 8 wherein, for said fullerene carbon of said component thereof, n is an integral value selected from the range from 30 to 35.

14. The tire of claim 13 where said tire component is a circumferential tread.

15. The tire of claim 8 wherein, for said fullerene carbon of said component thereof, n is greater than 35.

16. The tire of claim 15 wherein said tire component is a circumferential tread.

17. The tire of claim 8 wherein said tire component is a circumferential tread.

18. The tire of claim 5 wherein said tire component is a circumferential tread.

19. The tire of claim 1 wherein the fullerene carbon for said component thereof has a specific gravity of from about 1.2 to 1.7.

20. The tire of claim 19 wherein for said reinforcement for said component thereof is composed of about 10 to about 50 weight percent of at least one fullerene carbon thereof and, about 90 to about 50 weight percent of at least one of carbon black or precipitated silica.

21. The tire of claim 20 wherein said tire component is a circumferential tread.

22. The tire of claim 19 wherein said tire component is a circumferential tread.

23. The tire of claim 1 wherein at least a portion of said fullerene carbon reinforcement for said component thereof is selected from the group consisting of $C_{60}$, $C_{70}$, $C_{76}$, $C_{78}$, $C_{82}$, $C_{84}$, $C_{90}$, $C_{96}$, $C_{120}$ and mixtures thereof.

24. The tire of claim 23 wherein said tire component is a circumferential tread.

25. The tire of claim 23 wherein at least a portion of said fullerene carbon reinforcement for said component thereof is selected from the group consisting of $C_{60}$, $C_{70}$, $C_{76}$, $C_{78}$, $C_{82}$, $C_{84}$ and mixtures thereof.

26. The tire of claim 25 wherein said tire component is a circumferential tread.

27. A process of making a tire comprising combining at least one vulcanizable rubber and a sufficient amount of fullerene carbon reinforcing filler to result in a modification of the dynamic properties of the tire compared to those of the tire for which no fullerene carbon had been added, wherein the fullerene carbon is selected from the group consisting of fullerene carbons having the formula $C_{2n}$ where n is at least 30 and mixtures thereof.

28. The tire of claim 27 wherein, for said fullerene carbon, n is an integral value selected from the range from 30 to 35.

29. The process of claim 27 wherein, for said fullerene carbon, n is at least 36.

30. The process of claim 27 wherein the fullerene carbon has a specific gravity of from about 1.2 to 1.7.

31. The process of claim 27 wherein the fullerene carbon is present in an amount of from 10 phr to 90 phr.

32. The process of claim 27 wherein at least a portion of said fullerene carbon reinforcing filler for said component thereof is selected from the group consisting of $C_{60}$, $C_{70}$, $C_{76}$, $C_{78}$, $C_{82}$, $C_{84}$, $C_{90}$, $C_{96}$, $C_{120}$ and mixtures thereof.

33. The process of claim 32 wherein at least a portion of said fullerene carbon reinforcing filler for said component thereof is selected from the group consisting of $C_{60}$, $C_{70}$, $C_{76}$, $C_{78}$, $C_{82}$, $C_{84}$ and mixtures thereof.

34. A composition comprising at least one vulcanized rubber and a rubber reinforcement component comprised of a sufficient amount by weight of fullerene carbon in comparison to the rubber to result in a modification of the dynamic properties of the rubber compared to those of the rubber without any added fullerene carbon, wherein the fullerene carbon is selected from the group consisting of fullerene carbons having the formula $C_{2n}$ where n is at least 30 and mixtures thereof.

35. The composition of claim 34 wherein at least one vulcanizable rubber is a diene-based sulfur vulcanizable elastomer.

36. The composition of claim 35 wherein the elastomer is selected from the group consisting of homopolymers and copolymers of conjugated dienes and wherein the homopolymer is selected from the group consisting of natural cis-1,4-polyisoprene rubber, synthetic cis-1,4-polyisoprene rubber, 3,4-polyisoprene rubber, cis-1,4-polybutadiene rubber and mixtures thereof and wherein the copolymer is selected from the group consisting of isoprene/butadiene copolymer rubbers, styrene/butadiene copolymer rubbers, styrene/isoprene copolymer rubbers, butadiene/acrylonitrile copolymer rubbers, isoprene/acrylonitrile copolymer rubbers, styrene/isoprene/butadiene terpolymer rubbers, α-methylstyrene/butadiene copolymer rubbers, α-methylstyrene/isoprene copolymer rubbers, butadiene/acrylonitrile copolymer rubbers, isoprene/acrylonitrile copolymer rubbers, α-methylstyrene/isoprene/butadiene terpolymer rubbers and mixtures thereof.

37. The composition of claim 34 wherein the rubber is at least two diene-based elastomers.

38. The composition of claim 37 wherein the at least one diene-based elastomer is selected from the group consisting of natural cis-1,4-polyisoprene rubbers, synthetic cis-1,4-polyisoprene rubbers, 3,4-polyisoprene rubbers, cis-1,4-polybutadiene rubbers, styrene/isoprene/butadiene rubbers, isoprene/butadiene copolymer rubbers, styrene/butadiene copolymer rubbers, and butadiene-acrylonitrile copolymer rubbers.

39. The composition of claim 34 wherein the fullerene carbon has a specific density of from about 1.2 to 1.7.

40. The composition of claim 39 wherein for said reinforcement for said component thereof is composed of about 5 to about 90 weight percent of said fullerene carbon and, about 95 to about 10 weight percent of at least one of carbon black or precipitated silica.

41. The composition of claim 40 wherein for said reinforcement for said component thereof is composed of about 10 to about 50 weight percent of at least one fullerene carbon thereof and, about 90 to about 50 weight percent of at least one of carbon black or precipitated silica.

42. The composition of claim 41 wherein the reinforcement for said component thereof is present in an amount of from 35 phr to 90 phr.

43. The composition of claim 39 wherein, for said fullerene carbon of said component thereof, n is an integral value selected from the range from 30 to 35.

44. The composition of claim 39 wherein, for said fullerene carbon of said component thereof, n is greater than 35.

45. The composition of claim 39 wherein a curve resulting from a dynamic plot of a 1 Hz strain sweep at 23° C. is essentially horizontally flat, thereby indicating that minimal heat is being generated.

46. The composition of claim 39 wherein the value of G" is about $10^5$ pascals or less.

47. The composition of claim 39 wherein a curve of a dynamic plot of a programmed temperature sweep from 23° C. to 160° C. at constant 2 percent strain exhibits a value of G" which is about $10^5$ pascals or less.

48. The composition of claim 34 wherein at least a portion of said fullerene carbon reinforcement for said component thereof is selected from the group consisting of $C_{60}$, $C_{70}$, $C_{76}$, $C_{78}$, $C_{82}$, $C_{84}$, $C_{90}$, $C_{96}$, $C_{120}$ and mixtures thereof.

49. The composition of claim 48 wherein at least a portion of said reinforcement for said component thereof is selected from the group consisting of $C_{60}$, $C_{70}$, $C_{76}$, $C_{78}$, $C_{82}$, $C_{84}$ and mixtures thereof.

50. A composition comprising at least one vulcanizable rubber and a sufficient amount by weight of a carbon having at least one corranulene structure which does not form a closed cage, in comparison to the rubber to result in a modification of the dynamic properties of the rubber compared to those of the rubber without any added carbon having the corranulene structure.

51. A process for decreasing hysteresis of a tire comprising the step of adding at least one fullerene carbon to a rubber of said tire, sad tire comprising based on 100 parts by weight rubber (A) 100 parts by weight (phr) of at least one diene-based elastomer and (B) about 30 to about 100 phr of elastomer reinforcement composed of about 5 to about 100 weight percent of at least one fullerene carbon and from zero to about 95 weight percent of at least one of carbon black or precipitated silica; wherein said fullerene carbon is characterized by having the formula $C_{2n}$; where n is an integer of at least 30.

52. The process of claim 51 wherein said tire component is a tread intended to be ground-contacting.

53. The process of claim 52 wherein the elastomer for said component thereof is selected from the group consisting of homopolymers and copolymers of conjugated dienes and wherein the homopolymer is selected from the group consisting of natural cis-1,4-polyisoprene rubber, synthetic cis-1,4-polyisoprene rubber, 3,4-polyisoprene rubber, cis-1,4-polybutadiene rubber and mixtures thereof and wherein the copolymer is selected from the group consisting of isoprene/'butadiene copolymer rubbers, styrene/butadiene copolymer rubbers, styrene/isoprene copolymer rubbers, butadiene/acrylonitrile copolymer rubbers, isoprene/acrylonitrile copolymer rubbers, styrene/isoprene/butadiene terpolymer rubbers, α-methylstyrene/butadiene copolymer rubbers, α-methylstyrene/isoprene copolymer rubbers, butadiene/acrylonitrile copolymer rubbers, isoprene/acrylonitrile copolymer rubbers, α-methylstyrene/isoprene/butadiene terpolymer rubbers and mixtures thereof.

54. The process of claim 51 wherein the elastomer for said component thereof is at least one sulfur vulcanizable diene-based elastomer.

55. The process of claim 54 wherein the elastomer for said component thereof is at least two diene-based elastomers.

56. The process of claim 55 wherein at least one diene-based elastomer for said component thereof is selected from the group consisting of natural cis-1,4-polyisoprene rubbers, synthetic cis-1,4-polyisoprene rubbers, 3,4-polyisoprene rubbers, cis-1,4-polybutadiene rubbers, styrene/isoprene/butadiene rubbers, isoprene/butadiene copolymer rubbers, styrene/butadiene copolymer rubbers, and butadiene-acrylonitrile copolymer rubbers.

57. The process of claim 56 wherein for said reinforcement for said component thereof is composed of about 5 to about 90 weight percent of said fullerene carbon and, about 95 to about 10 weight percent of at least one of carbon black or precipitated silica.

58. The process of claim 57 wherein the reinforcement for said component thereof is present in an amount of from 35 phr to 90 phr.

59. The process of claim 56 wherein, for said fullerene carbon of said component thereof, n is an integral value selected from the range from 30 to 35.

60. The process of claim 51 wherein the fullerene carbon for said component thereof has a specific gravity of from about 1.2 to 1.7.

61. The process of claim 60 wherein for said reinforcement for said component thereof is composed of about 10 to about 50 weight percent of at least one fullerene carbon thereof and, about 90 to about 50 weight percent of at least one of carbon black or precipitated silica.

\* \* \* \* \*